Dec. 17, 1957  F. BRADFORD  2,816,686
SEALING OF FUEL TANKS OR LIKE CONTAINERS
Filed Aug. 24, 1956

INVENTOR
FRED BRADFORD
BY Stevens, Davis, Miller & Mosher
ATTORNEYS

United States Patent Office 2,816,686
Patented Dec. 17, 1957

2,816,686

SEALING OF FUEL TANKS OR LIKE CONTAINERS

Fred Bradford, Preston, England, assignor to The English Electric Company Limited, London, England, a British company Application August 24, 1956, Serial No. 606,021

4 Claims. (Cl. 220—81)

The invention relates to the sealing of liquid and/or gas tight containers for example integral wing fuel tanks for aircraft.

In such fuel tanks the problem arises to seal gaps in the corners between adjacent structural members for example between angle profiles attached with one flange to the top or bottom skin of the aircraft wing and with the other flange to a wall panel, perpendicular to said skin, and a reinforcement member arranged in a corner where two such perpendicular wall panels meet one another. Usually a packing piece of the same thickness as the flanges of the angle profiles facing one another with their edges, for example of the angle profiles attached with their other flanges to the top and bottom skin, respectively, is arranged between the wall panel to which these opposite flanges are attached and a re-inforcement member perpendicular to these two angle profiles and fitted to the free faces of the opposite flanges thereof. This packing piece is of the same thickness as the said opposite flanges and fills the space which would otherwise be left between the said re-inforcement member and the adjacent wall panel. However, for reasons of production it would be extremely difficult to provide a liquid tight butt joint between the ends of said packing piece and the edges of the said opposite flanges facing the same.

According to the invention a cylindrical bore is provided with part of its circumference in a structural member and part in an adjacent packing piece, said bore passing also through a re-inforcement member overlapping the said structural member and packing piece, a cylindrical resilient sealing plug being inserted into said bore and being deformed by axial compression so as to extend into a gap between the said structural member and packing piece, providing a seal between these members.

Preferably a smaller bore than the aforesaid bore is provided co-axially thereto in the said plug and in the said wall panel adjacent the said structural member and packing piece, and wherein a washer is located axially movable in the aforesaid bore of the said re-inforcement member, a screw bolt passing through the smaller bore and carrying a nut outside the said wall panel which when tightened compresses the said resilient plug between the said movable washer and the inner face of the said wall panel.

Thereby the said plug is deformed and provides a tight seal at its end face contacting the tank wall, and between the edges facing one another of the packing piece and of the flange of the said profile, the rubber flowing slightly into the gap between these edges on both sides of the bore.

Preferably the said bore is arranged eccentrically to the said gap leaving a greater proportion of its circumference in the packing piece and merely a shallow arcuate recess in the flange, so as not to weaken the latter more than necessary for attaining the seal desired.

In order that the invention may be clearly understood and readily carried into effect an embodiment thereof will now be described by way of example with reference to the accompanying drawing, in which.

Figure 1:
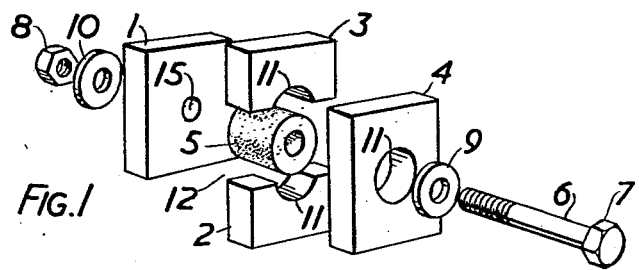
Fig. 1 is a diagrammatic exploded perspective view of a sealed joint.

In Fig. 1, item 1 represents the tank wall, item 2 a packing piece, item 3 a stressed structural member, say the flange of an angle profile attached to said wall, item 4, another stressed structural member, say a corner reinforcement member, item 5 a seal plug of synthetic rubber, item 6 a screw bolt having a head 7, a nut 8, and two washers 9 and 10.

A cylindrical bore 11 passes through the members 4 and 2, 3, a gap 12 between said members 2, 3 cutting across said bore 11. A small bore 15, coaxial to the bore 11 and plug 5 extends through the latter and through member 1, and the screw bolt 6 is inserted into it. The washer 9 under the bolt head 7 fits with clearance into the bore 11 in the member 4, while the washer 10 under the nut 8 bears on the side of the member 1 facing away from the members 2, 3.

Figures 2, 3:
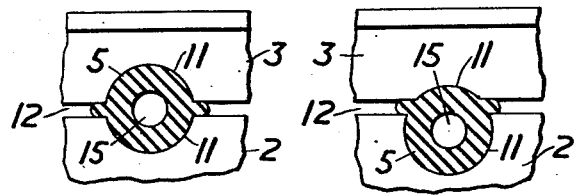
Fig. 2 is a diagrammatic axial view on a bore with the plug deformed partly into the gap to be sealed.
Fig. 3 is a modification of Fig. 2.

When the nut 8 is tightened, the washer 9 bears on the end face of the seal plug 5 and compresses the same between the wall face of member 1 and said washer 9. The compressed plug 5 is thereby also partly deformed into the gap 12 as shown in Figs. 2 and 3. The plug 5 must, therefore, be of sufficient length so that when compressed a portion of it is still in the bore 11 of the member 4.

While in Fig. 2 (as in Fig. 1) the gap 12 cuts diametrically across the bore 11, it is eccentrically arranged in Fig. 3 leaving in the stressed structural member 3 merely a shallow arcuate recess, while leaving the larger proportion of bore 11 in the packing piece 2, whereby the weakening of member 3 is reduced to a minimum.

Figure 4:
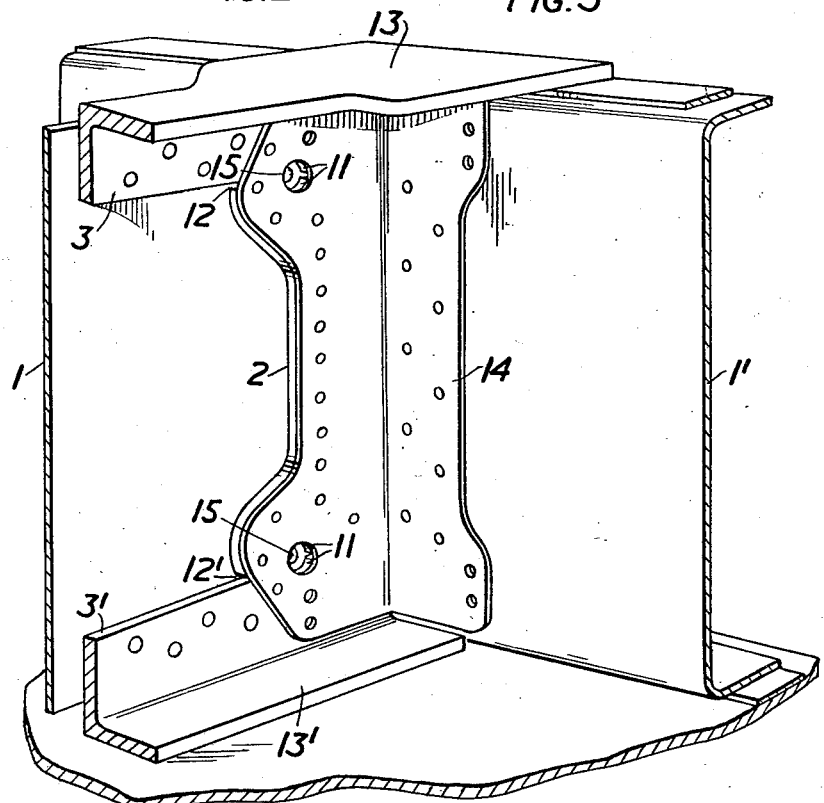
Fig. 4 is a diagrammatic perspective view of a corner of an integral wing fuel tank for aircraft.

Referring now to Fig. 4, the angle profiles 13, 13' are riveted to the vertical tank wall 1. A corner reinforcement piece 14 is riveted to the said tank wall 1, and to another vertical tank wall 1' arranged at an angle thereto. A packing piece 2 is arranged under the reinforcement piece 14 between the flanges 3, 3' facing one another of the angle profiles 13, 13' leaving gaps 12, 12' between itself and the edges of the said flanges 3, 3' respectively. The bores 11 in the members 2 and 3, 3' respectively, and 14, and the small concentrical holes 15 are also shown, but the other items of Fig. 1 are omitted from Fig. 4 for clarity.

A similar seal can be effected in substantially horizontal planes between the skins of the aircraft wing serving as top and bottom walls of the integral fuel tank, and the spar booms and rib flanges.

When the said gaps exceed a certain width owing to production tolerances, they are preferably opened up, and filler pieces are inserted tightly, reducing the gap to a manageable magnitude.

In the case of eccentrical disposition of the bore with respect to the gap, the sharp corners resulting on the component accommodating the larger proportion of the said bore may be broken or rounded.

What I claim as my invention and desire to secure by Letters Patent, is:

1. A fluid-tight container comprising in combination: wall panels, structural members and reinforcement members attached to the said wall panels at the margins thereof, the said reinforcement members overlapping adjacent structural members, packing pieces arranged between the said reinforcement members and adjacent wall panel so as to make up for the thickness of the adjacent structural members, a cylindrical bore being provided with one part of its circumference in a structural member and with another part in an adjacent packing piece, said bore passing also through the reinforcement member overlapping the said structural member and packing piece, a cylindrical resilient sealing plug inserted into the said bore, and compression means adapted to deform the said plug by axial compression into sealing contact with the said wall panel packing piece and structural member.

2. A fluid-tight container as claimed in claim 1, wherein a gap is left between the adjacent edges of the said packing piece and structural member, the said bore in the structural member and packing piece being arranged eccentrically to the said gap in such a manner that a shallow arcuate recess only is cut out of the edge of the said structural member, and a recess larger than a semi-circle is cut out of the edge of the said packing piece.

3. A fluid-tight container as claimed in claim 2 wherein the corners of the said recess in the packing piece are rounded.

4. A fluid-tight container comprising in combination: wall panels, structural members and reinforcement members attached to the said wall panels at the margins thereof, the said reinforcement members overlapping at their ends adjacent structural members running transversely to them along opposite margins of a wall panel, packing pieces arranged between the said reinforcement members and adjacent wall panel so as to make up for the thickness of the adjacent structural members, a cylindrical bore being provided with one part of its circumference in a structural member and with another part in an adjacent packing piece, said bore passing also through the reinforcement member overlapping the said structural member and packing piece, a cylindrical resilient plug inserted into the said bore, a bore of smaller diameter passing through the said plug and adjacent wall panel co-axially to the aforesaid bore, a screw bolt passing through the said smaller bore, a nut screwed on the said screw bolt, and a washer filed on the said screw bolt and bearing on the end face of the said plug while clearing the bore in the said reinforcement member, the said nut and screw bolt when tightened deforming the said plug by axial compression into sealing contact with the said wall panel, packing piece and structural member.

References Cited in the file of this patent

UNITED STATES PATENTS 2,723,048   Welch _____ Nov. 8, 1955